(12) United States Patent
Merx et al.

(10) Patent No.: US 8,894,479 B2
(45) Date of Patent: Nov. 25, 2014

(54) FORAGE HARVESTER WITH AN ARRANGEMENT FOR MEASURING THE HARVESTED MATERIAL THROUGHPUT

(75) Inventors: Stephan Merx, Partenheim (DE); Werner Flohr, Kaiserslautern (DE)

(73) Assignee: Deere & Company, Moline, IL (US)

( * ) Notice: Subject to any disclaimer, the term of this patent is extended or adjusted under 35 U.S.C. 154(b) by 132 days.

(21) Appl. No.: 13/614,309

(22) Filed: Sep. 13, 2012

(65) Prior Publication Data
US 2014/0073379 A1 Mar. 13, 2014

(30) Foreign Application Priority Data
Sep. 15, 2011 (DE) .......................... 10 2011 082 727

(51) Int. Cl.
| A01F 7/00 | (2006.01) |
| A01F 29/09 | (2010.01) |
| A01F 29/12 | (2006.01) |
| A01F 29/06 | (2006.01) |

(52) U.S. Cl.
CPC .............. *A01F 29/09* (2013.01); *A01F 29/12* (2013.01); *A01F 29/06* (2013.01)
USPC .......................................................... 460/22

(58) Field of Classification Search
USPC .......................................... 56/16.4 B; 460/22
See application file for complete search history.

(56) References Cited

U.S. PATENT DOCUMENTS

| 2,857,946 | A | * | 10/1958 | Nikkel ............................. 241/55 |
| 3,805,660 | A | * | 4/1974 | Burrough ......................... 83/658 |
| 4,696,432 | A | * | 9/1987 | Russ et al. ............. 241/101.742 |
| 5,558,282 | A | * | 9/1996 | Ameye et al. .................... 241/60 |
| 6,073,428 | A | * | 6/2000 | Diekhans .................... 56/10.2 R |
| 6,272,819 | B1 | * | 8/2001 | Wendte et al. .................. 56/11.9 |
| 6,604,352 | B1 | * | 8/2003 | Tyvaert et al. .............. 56/16.4 B |
| 7,137,237 | B2 | * | 11/2006 | Van Vooren et al. ........... 56/12.8 |
| 7,654,068 | B2 | * | 2/2010 | Baaken ....................... 56/16.4 B |
| 7,739,861 | B2 | * | 6/2010 | Mackin ....................... 56/10.2 G |
| 2008/0234020 | A1 | * | 9/2008 | Isfort ............................ 460/112 |
| 2008/0264024 | A1 | * | 10/2008 | Baaken ....................... 56/10.2 B |
| 2012/0245802 | A1 | * | 9/2012 | Schlesser et al. ............... 701/50 |

FOREIGN PATENT DOCUMENTS

| DE | 9002780 | U1 | 5/1990 |
| DE | 19603928 | | 8/1997 |
| DE | 19603928 | A1 | 8/1997 |
| EP | 0463240 | | 1/1992 |
| EP | 0463240 | A1 | 1/1992 |

OTHER PUBLICATIONS

Auernhammer et al., "Yield Measurement on Self Propelled Forage Harvesters", vol. 95, Issue 1757 of ASAE Paper, 18 pages.
European Search Report, dated Dec. 13, 2012 (4 pages).

* cited by examiner

*Primary Examiner* — Thomas B Will
*Assistant Examiner* — Mai Nguyen

(57) ABSTRACT

A forage harvester has an engine which is drivingly connected to a chopper cylinder via first drive belt, and to a first end of a drive shaft of a discharge accelerator. A second end of the drive shaft of the discharge accelerator is drivingly connected to a kernel processor via a second drive belt, is arranged, in the direction of harvested material flow, between the chopper cylinder and the discharge accelerator. The discharge accelerator comprises support disks which extend radially, and paddles. The support disks are attached to a hollow shaft enclosing the drive shaft, and, a sensor is arranged between the drive shaft and the discharge accelerator for the determination of the force transmitted by the drive shaft to the discharge accelerator.

2 Claims, 3 Drawing Sheets

FORAGE HARVESTER WITH AN ARRANGEMENT FOR MEASURING THE HARVESTED MATERIAL THROUGHPUT

FIELD OF THE DISCLOSURE

The invention relates to a forage harvester having a combustion engine which is drivingly connected to a chopper cylinder via a first drive belt, and to a first end of a drive shaft of a discharge accelerator which is arranged downstream of the chopper cylinder, with respect to a direction of harvested material flow, wherein a second end of the drive shaft of the discharge accelerator is drivingly connected or is connectable to a kernel processor via a second drive belt for cracking kernels contained in the harvested material stream, wherein the kernel processor is arranged, viewed in the direction of harvested material flow, between the chopper cylinder and the discharge accelerator, and wherein the discharge accelerator comprises support disks which are drivingly connected to the drive shaft and which extend radially, and paddles for the conveyance of harvested material, which are attached to the support disks.

BACKGROUND OF THE DISCLOSURE

In forage harvesters, it is of interest to determine the given harvested material throughput, for the purpose of precision agriculture, automated metering of a silylation agents or accounting for contractors. For this purpose, various sensors have been proposed which measure the harvested material throughput, for example, on the basis of the separation between the upper and lower preliminary press rolls, the intensity of the radiation penetrating the harvested material stream, the power consumption of a chopper cylinder, or of a discharge accelerator arranged downstream of the chopper cylinder (Auernhammer at al., Yield Measurement on Self Propelled Forage Harvesters, ASAE Paper No. 951757). In practice, the throughput measurement using radiation has not been found to be acceptable, and the measurement of the separation between the preliminary press rolls is, on the one hand, relatively imprecise, particularly in the case of a feed channel that is filled non-homogeneously in the transverse direction, and, on the other hand, it also requires knowledge of the density of the harvested material, to evaluate the mass throughput which is considered to be particularly relevant. The disadvantages do not exist in the case of the determination of the drive moment of the discharge accelerator.

However, in forage harvesters, there is usually a kernel processor arranged, when viewed in the direction of harvested material flow, between the chopper cylinder and a discharge accelerator, which kernel processor is driven by the drive shaft of the discharge accelerator during corn harvesting to crack the kernels contained in the harvested material stream. For this purpose, the drive shaft of the discharge accelerator is driven on the side of the discharge accelerator by a belt pulley, against which a drive belt driven by the combustion engine of the forage harvester is applied, while, on the other side of the discharge accelerator, a belt pulley, mounted on the drive shaft, drives the kernel processor, via an additional drive belt (see DE 196 03 928 A1). A direct determination of the drive moment at the drive shaft is consequently not possible.

In EP 0 463 240 A1, a chaff conveyor in a combine harvester is described, which comprises paddles linked by springs to a shaft. On the basis of the angle of the paddles with respect to the shaft, the material throughput is determined with an optical sensor which in addition works in cooperation with a reference element attached rigidly to the shaft.

SUMMARY OF THE DISCLOSURE

The problem which the present disclosure seeks to solve is to provide a forage harvester having an improved arrangement, compared to the prior art, for measuring the harvested material throughput, on the basis of the determination of the drive moment of an discharge accelerator.

The forage harvester comprises a combustion engine, generally a diesel engine. The combustion engine is drivingly connected, via a first drive belt, to a chopper cylinder, and to a first end of a drive shaft of a discharge accelerator arranged, with respect to a direction of harvested material flow, downstream of the chopper cylinder. A second end of the drive shaft of the discharge accelerator is drivingly connected to a kernel processor for cracking kernels via a second drive shaft contained in the harvested material stream, or it can be drivingly connected to the kernel processor. The kernel processor is arranged, or can be positioned, as viewed in the direction of harvested material flow, between the chopper cylinder and the discharge accelerator. The discharge accelerator consists of support disks which extend radially, and of paddles attached to the support disks, for the conveyance of harvested material. The support disks are attached to a hollow shaft enclosing the drive shaft. Between the discharge accelerator and the drive shaft, a sensor is arranged, for the determination of the force transmitted by the drive shaft to the hollow shaft.

In this manner, the drive shaft of the discharge accelerator can be used for passing on the drive power of the combustion engine to the kernel processor, while the drive power of the discharge accelerator can nevertheless be determined.

In a preferred embodiment, the discharge accelerator is connected at one end to a flange which comprises first projections which protrude radially inward, while the drive shaft is connected to the rotor which comprises second projections which protrude radially outward, and the sensor is arranged between the first projections and the second projections. The rotor can be arranged particularly within a hollow inner space of the flange.

It is possible to apply the sensor to a first end of the post accelerator, and to retain the post accelerator at its second end opposite the drive shaft in a pivot bearing.

BRIEF DESCRIPTION OF THE DRAWINGS

An embodiment of the disclosure is described in detail below with reference to the accompanying drawing figures, wherein.

DETAILED DESCRIPTION OF THE DRAWINGS

Figure 1:
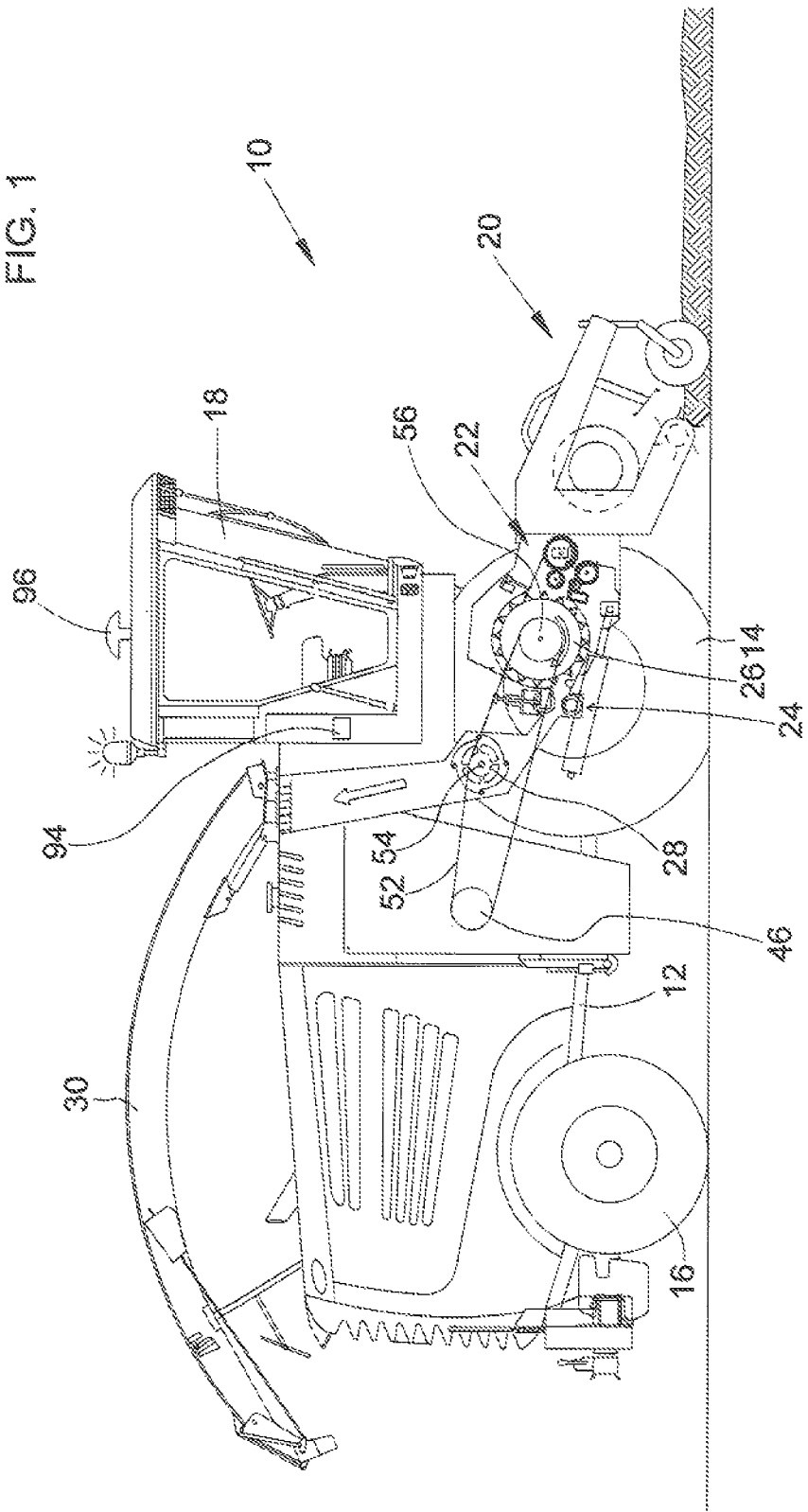
FIG. 1 is a diagrammatic side view of a forage harvester.

In FIG. 1, a self propelled forage harvester 10 is represented in a diagrammatic side view. The forage harvester 10 consists of a frame 12 which is supported by front driven wheels 14 and steerable rear wheels 16. The operation of the forage harvester 10 occurs from an operator station 18, from which a harvesting attachment 20 in the form of a pickup element is visible. By way of the harvesting attachment 20, harvested material, for example, grass or the like, which has been picked up from the ground by the harvesting attachment 20, is fed via a feed conveyor 22 with preliminary press rolls, which are arranged within a feeder housing on the front side of the forage harvester 10, is fed to a chopper cylinder 26 arranged beneath the operator station 18, which chops the harvested material into small pieces, and delivers it to an discharge accelerator 28. The product leaves the forage harvester 10 for a transport vehicle which is driven along side, via a discharge elbow 30 which is rotatable about an approximately vertical axle and whose inclination is adjustable. Between the chopper cylinder 26 and the discharge accelerator 28, a kernel processor 24 having two rolls is arranged, which, during e.g. the corn harvest, is used to crack kernels in the harvested material. The roils of the kernel processor 24, for harvesting grass, as illustrated, can be brought in to sufficiently separated position from one another, or they are removed from the harvested material flow, or disposed away from the harvested material flow or entirely outside of the forage harvester. As used below, direction information, such as, on the side, at the bottom and at the top, are relative to the forward motion direction V of the forage harvester 10, which, in FIG. 1 moves to the right.

Figure 2:
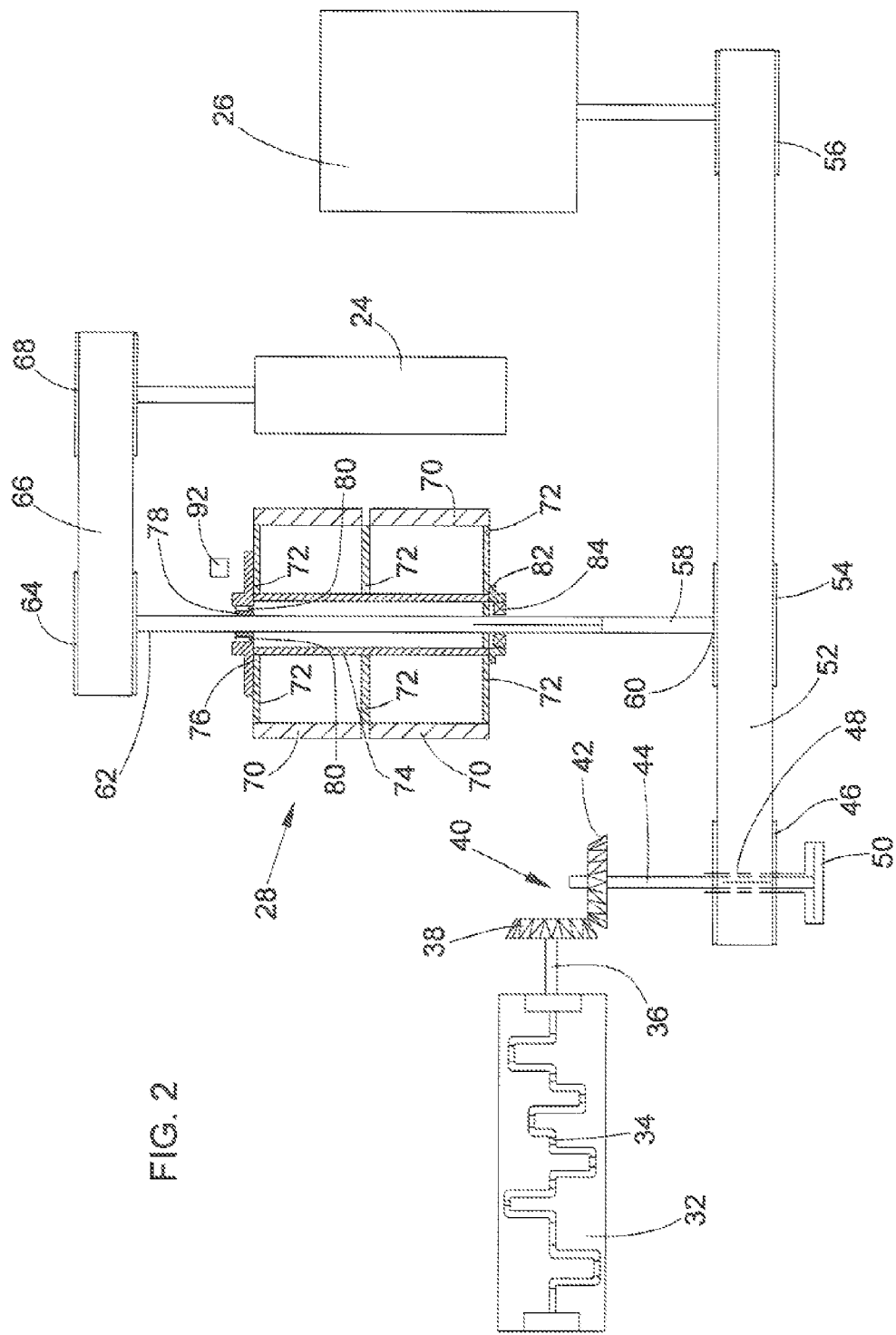
FIG. 2 is a diagrammatic top view of the drive arrangement of the forage harvester.

FIG. 2 shows a to view of the drive arrangement of the forage harvester 10. In the rear area, a combustion engine 32 arranged in the driving direction V is located. The combustion engine 32, during operation, drives a longitudinal shaft 36 by way of its crankshaft 34, which longitudinal shaft is connected to a first conical toothed wheel 38 of a bevel gear set 40. A second conical toothed wheel 42 of the bevel gear set 40 is connected to a transverse shaft 44, which extends through a hollow shaft 48 connected to a belt pulley 46, to the side of the belt pulley 46, which faces away from the bevel gear 40, and is connected there to a clutch 50. A first drive belt 52 loops around the belt pulley 46, and also around a belt pulley 54 for driving the discharge accelerator 28, and around a belt pulley 56 for driving the chopper cylinder 26. On the outlet side, the clutch 50 is connected to the hollow shaft 48, and makes it possible to switch the drive belt 52, and thus also the chopper cylinder 26 and the discharge accelerator 28, on and off.

The belt pulley 54 is connected to a first end 60 of a drive shaft 58 for driving the discharge accelerator 28. The second end 62 of the drive shaft 58 is connected to a belt pulley 64 which, during the corn harvest, drives two belt pulleys 68 (of which only one is represented in FIG. 2, see, however, DE 196 03 928 A1), via a second drive belt 66, the belt pulleys in turn driving the rolls of the kernel processor 24 only during the corn harvest.

The discharge accelerator 28 comprises a number of paddles 70 extending transverse to the direction of harvested material flow, paddles which are rigidly connected to a hollow shaft 74 divided, by means of support disks 72, which extend radially to the drive shaft 58, of which three are distributed over the width of the discharge accelerator 28. The paddles 70 extend in each case between two support disks 72 and are attached to them. The hollow shaft 74 encloses the drive shaft 58 concentrically. The discharge accelerator 28 is connected, at its first end (included in the drawing at the top right in the embodiment according to FIG. 2) to a flange 76. The flange 76 is attached, in the represented embodiment, by a screw connection to the support disks 72 adjacent to it; however, it could also be directly welded to the hollow shaft 74, or connected to it in another manner. The flange 76 comprises a central hollow cavity, in which a rotor 78 which is rigidly connected to the drive shaft 58 is arranged. Between the rotor 74 the flange 76, at least one sensor 80 is attached for the determination of and the drive force transmitted by the drive shaft 58 to the movable elements (i.e., hollow shaft 74, support disks 72, and paddles 70) of the discharge accelerator 28. The second end of the discharge accelerator 28—drawn at the bottom in FIG. 2—is retained via a support flange 82 and via a pivot bearing 84 on the drive shaft 58. In the represented embodiment, the support flange 82 is screwed to the support disk 72 which is adjacent to it; however, it could also be welded directly to the hollow shaft 74, or connected to it in another manner.

Figure 3:
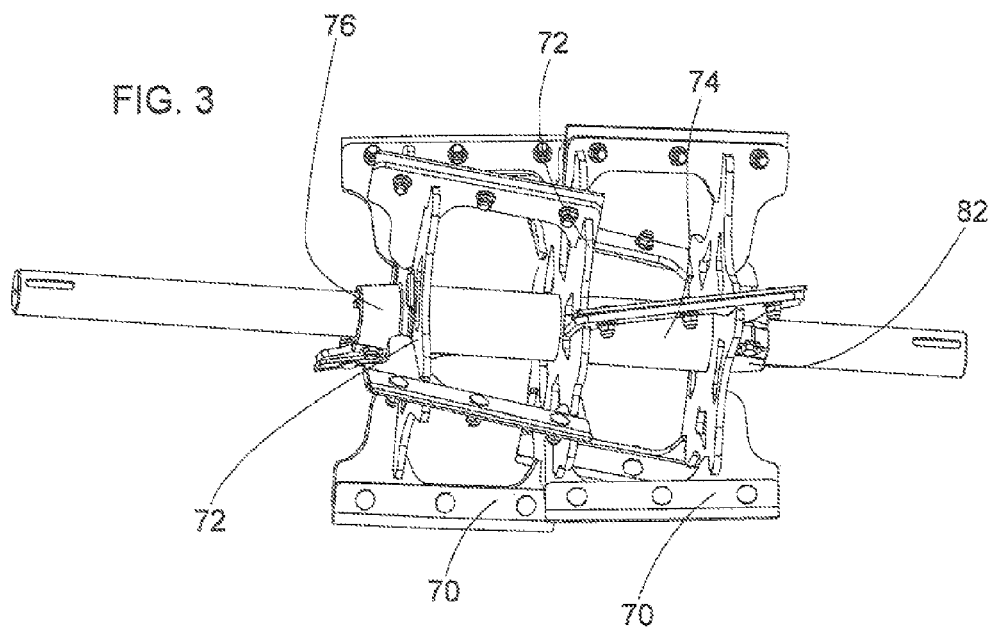
FIG. 3 is a perspective view of the discharge accelerator and of the drive shaft; and, FIG. 4 is a perspective view of a flange having a central rotor and a sensor.
Figure 4:
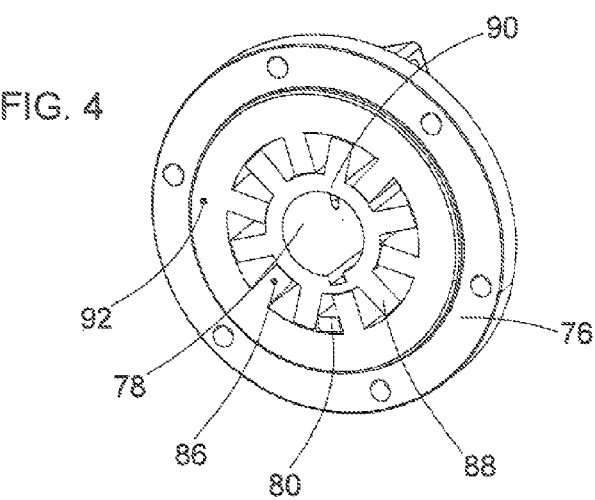

The arrangement of the discharge accelerator 28 is depicted in a perspective view in FIG. 3, while FIG. 4 shows the flange 76, the rotor 78, and a sensor 80. The flange 76 is provided with an annular section 92 which extends from the flange 76 proper outward in the axial direction, and comprises projections 86 which protrude radially inward, and extend up to the immediate vicinity of a cylindrical, central area 90 of the rotor 78 which is rigidly connected via a slot-wedge connection to the drive shaft 58. Analogously, the rotor 78 comprises projections 88 which protrude radially outward, and which extend up to the immediate vicinity of the annular section 92. Between the adjacent projections 86, 88, aligned in the axial direction one under the other, the sensor 80 is arranged, which may be any desired pressure or force receiving sensor. Since, on the flange and rotor side, three projections 86, 88 are present in each case, a total of three sensors 80 can be distributed over the circumference of the drive shaft 58, for the determination of the force transmitted by the drive shaft 58 to the discharge accelerator 28.

Since, during operation, the sensor 80 rotates, its output signal can be transmitted via contact rings on the drive shaft 58, or in a manner which in itself is known by electromagnetic waves (see DE 199 50 652 A1) to a receiving sensor 92 adjacent to the drive shaft 58, which receiving sensor is connected to a control device 94 (see FIG. 1). The control device 94 can convert the signals of the sensor 80, using appropriate calibration data, to mass throughput values (for example, in units of kg/s), and display them for the operator in the operator station 18, and/or record them with geographic referencing based on the use of position signals of a satellite-based position determination system 96, to allow for their later use for accounting purposes in the case of contract work and/or for the purposes of precision agriculture. Alternatively or additionally, they are used for the automatic metering of a silylation agent addition (not shown), or the automatic presetting of the driving speed or the combustion engine rpm of the forage harvester 10.

Finally, it should be noted that it would be possible to measure the frictional force at the bottom of the housing of the discharge accelerator 28, i.e., the forces in the radial and/or in the peripheral direction of the discharge accelerator 28 exerted by the harvested material on the bottom of the housing of the discharge accelerator 28, by means of any desired sensors, such as resistance strain gauges or optical sensors (see DE 10 2004 052 446 A1), and to combine them with the measured values of the sensor, to increase the accuracy.

Having described an exemplary embodiment, it will become apparent that various modifications can be made without departing from the scope of the invention as defined in the accompanying claims.

The invention claimed is:

1. A forage harvester having a combustion engine drivingly connected to a chopper cylinder via a first drive belt, and to a first end of a drive shaft of a discharge accelerator, the discharge accelerator being arranged, with respect to a direction of harvested material flow, downstream of the chopper cylinder, a second end of the drive shaft of the discharge accelerator is drivingly connected to a kernel processor via a second drive belt, the kernel processor being arranged between the chopper cylinder and the discharge accelerator and the discharge accelerator comprises support disks which extend radially, and which are drivingly connected to the drive shaft, and paddles for the conveyance of harvested material, which are attached to the support disks, wherein:

the support disks are attached to a hollow shaft enclosing the drive shaft;

a sensor is arranged between the drive shaft and the discharge accelerator for the determination of the force transmitted by the drive shaft to the discharge accelerator; and the discharge accelerator is connected to a flange which comprises first projections, which protrude radially inward, the drive shaft is connected to a rotor which comprises second projections which protrude radially outward, and the sensor is arranged between the first projections and the second projections.

2. A forage harvester having a combustion engine drivingly connected to a chopper cylinder via a first drive belt, and to a first end of a drive shaft of a discharge accelerator, the discharge accelerator being arranged, with respect to a direction of harvested material flow, downstream of the chopper cylinder, a second end of the drive shaft of the discharge accelerator is drivingly connected to a kernel processor via a second drive belt, the kernel processor being arranged between the chopper cylinder and the discharge accelerator and the discharge accelerator comprises support discs which extend radially, and which are drivingly connected to the drive shaft, and paddles for the conveyance of harvested material, which are attached to the support discs, wherein:

the support disks are attached to a hollow shaft enclosing the drive shaft;

a sensor is arranged between the drive shaft and the discharge accelerator for the determination of the force transmitted by the drive shaft to the discharge the discharge accelerator is connected to a flange which comprises first projections, which protrude radially inward, the drive shaft is connected to a rotor which comprises second projections which protrude radially outward, and the sensor is arranged between the first projections and the second projections; and the rotor is arranged within a hollow inner space of the flange.

* * * * *